United States Patent [19]

Siefer

[11] 4,406,785

[45] Sep. 27, 1983

[54] DIESEL FUEL HEATER

[75] Inventor: David A. Siefer, Gloversville, N.Y.

[73] Assignee: GTE Products Corporation, Stamford, Conn.

[21] Appl. No.: 334,292

[22] Filed: Dec. 24, 1981

[51] Int. Cl.³ .................... F02M 31/00; B01D 35/18
[52] U.S. Cl. .................................. 210/186; 123/557; 210/184; 219/205; 219/307
[58] Field of Search ............... 123/557; 210/184, 186; 219/205, 206, 207, 306, 307

[56] References Cited

U.S. PATENT DOCUMENTS

| 4,091,265 | 5/1978 | Richards | 123/557 |
| 4,279,234 | 7/1981 | Marcoux | 123/549 |
| 4,321,136 | 3/1982 | Matsui | 210/186 |
| 4,354,946 | 10/1982 | Warlick | 210/184 |
| 4,369,110 | 1/1983 | Picek | 210/184 |
| 4,372,260 | 2/1983 | Baker | 210/184 |

FOREIGN PATENT DOCUMENTS 2845520 5/1980 Fed. Rep. of Germany ...... 210/186

Primary Examiner—Ronald H. Lazarus
Attorney, Agent, or Firm—James Theodosopoulos

[57] ABSTRACT

The diesel fuel heater is PTC energized and is for heating gelled diesel fuel to a liquid state so as to improve engine performance particularly for engine starting. The heater is compact and is preferably integrated in a fuel filter housing. The heater basically comprises a diesel fuel heater housing and a PTC mounting plate, both of which are mounted in the fuel filter housing over the filter element. A preferably annular fuel flow channel is defined between the heater housing and PTC mounting plate with the diesel fuel adapted to pass directly over the PTC thermistors as the fuel flows from housing inlet to the filter element. A spring biasing contact is disposed intermediate the heater housing and PTC mounting plate to retain the PTC thermistors in place.

10 Claims, 7 Drawing Figures

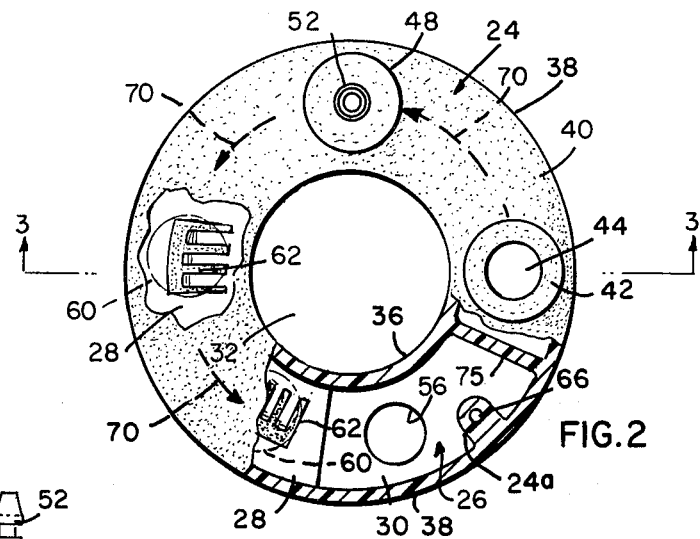
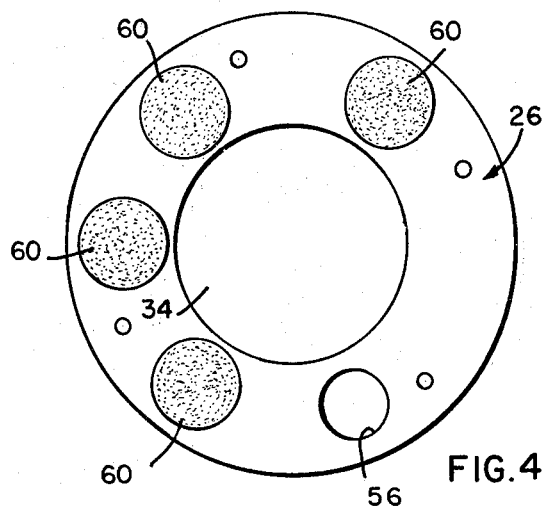

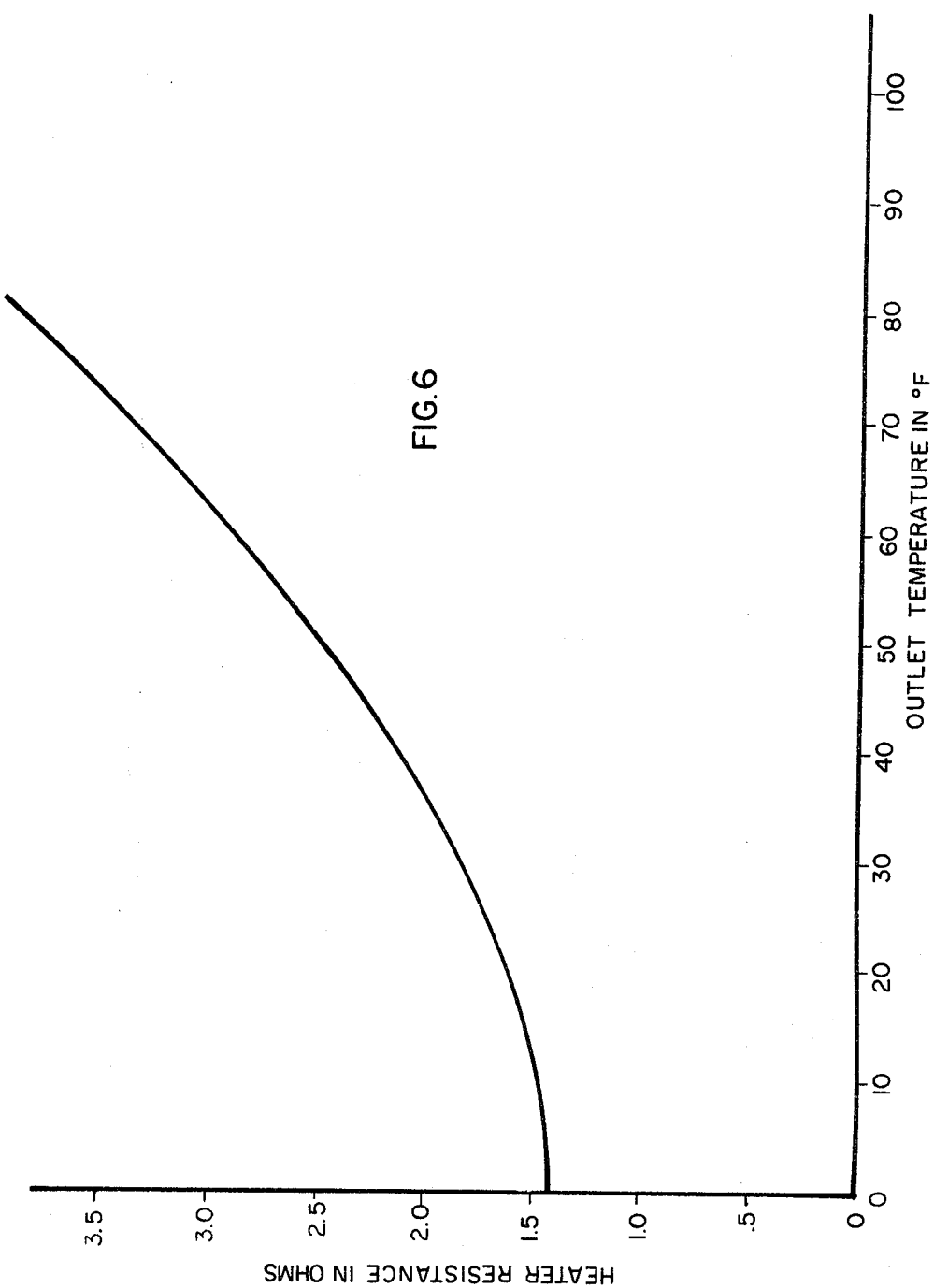

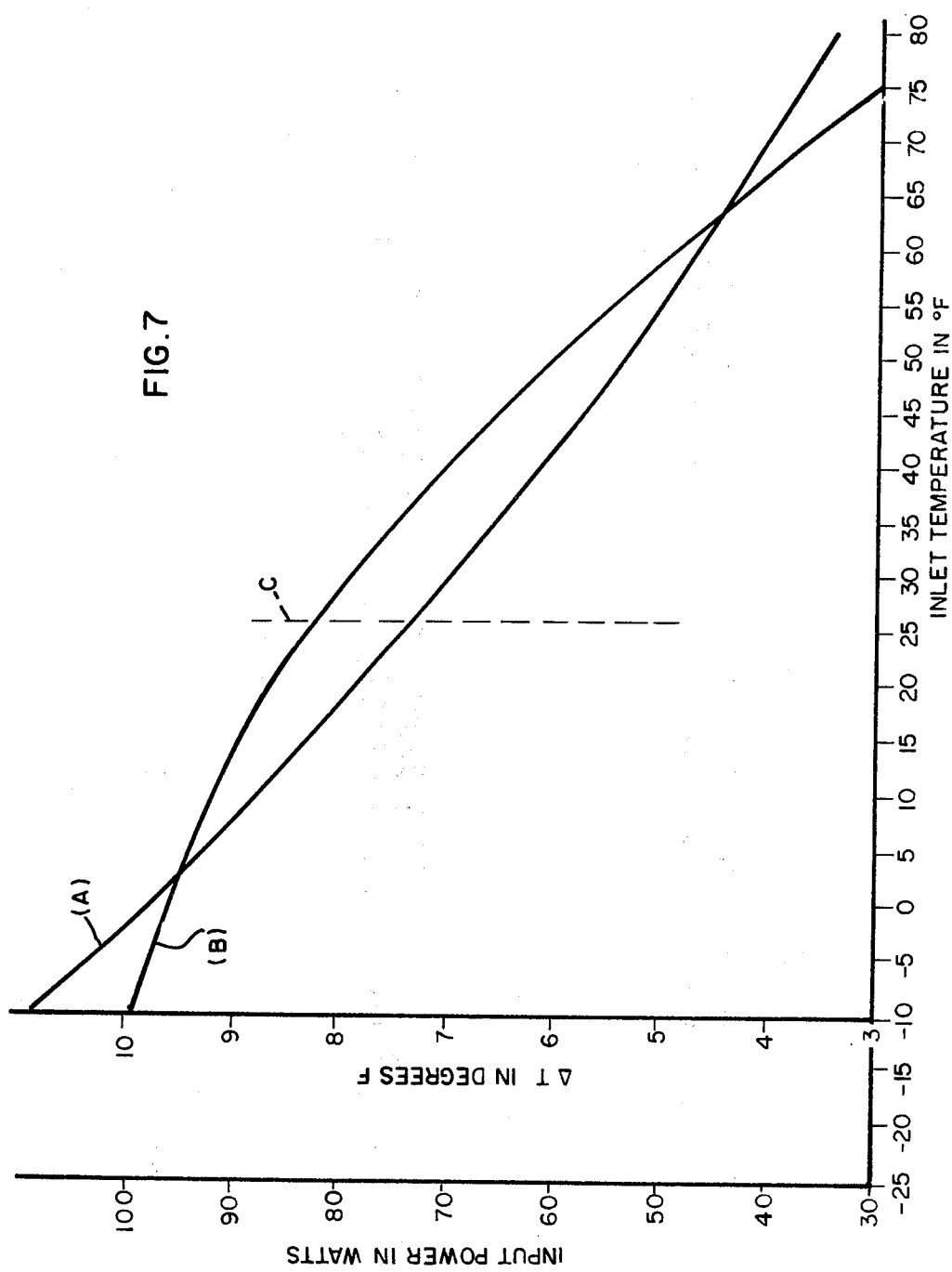

DIESEL FUEL HEATER

BACKGROUND OF THE INVENTION

The present invention relates in general to a diesel fuel heater, and pertains, more particularly, to a heater for diesel fuel that employs as the heat source, positive temperature coefficient (PTC) thermistors.

The use of diesel engines has increased dramatically in recent years. This increased popularity, is due to, inter alia, improved fuel mileage in comparison with the standard gasoline engine, and also reduced pollutants. However, diesel engines have characteristically been troublesome in cold weather starting. In sufficiently cold temperatures, the diesel fuel has a tendency to gel causing difficulties in engine starting. Moreover, engine stalling is also quite commonplace. At present, fuel line heaters are employed, such as the type that uses a resistance wire wrapped in an insulator. However, such heaters are not totally efficient and also require a thermostat so as to regulate the heater temperature so that fuel ignition does not occur.

SUMMARY OF THE INVENTION

Accordingly, it is an object of the present invention to provide an improved diesel fuel heater, particularly one that embodies PTC thermistors as the heat source.

Another object of the present invention is to provide a diesel fuel heater that is compact and that is preferably integrated in a fuel filter housing. The heater of this invention is particularly adapted for providing optimum heat rise to the fuel prior to circulation through the filter element.

A further object of the present invention is to provide an improved diesel fuel heater employing PTC thermistors obviating the requirements for a thermostat. In this way, accidental combustion at the heater is eliminated. With the use of a thermostat such combustion has been possible.

Still another object of the present invention is to provide an improved diesel fuel heater that is characterized by the substantial elimination of annoying engine stalling which has been due to the starvation of the fuel injectors resulting when the fuel gels, particularly under cold weather conditions.

Still a further object of the present invention is to provide an improved diesel fuel heater that provides controlled heating of the diesel fuel to prevent gelling and further increases the efficiency of the engine by vaporizing more completely the diesel fuel injected into the combustion chamber.

Another object of the present invention in accordance with one embodiment described herein, is to provide relatively low temperature PTC thermistors which again are helpful in obviating the need for a separate thermostat.

To accomplish the foregoing and other objects of this invention there is a diesel fuel heater which comprises a hollow housing means having an inlet and an outlet with a heating means disposed in the housing means. The heating means comprises at least one positive temperature coefficient (PTC) thermistor and means for coupling power to the thermistor. The housing means has defined therein, a fuel passage extending from inlet to outlet and including means for mounting the thermistor in a position for direct flow of fuel thereover. In the preferred embodiment disclosed herein, the heater is disclosed integrally in combination with a fuel filter housing having an inlet and outlet and including a filter element secured to the filter housing. The means for mounting the thermistor is preferably a heat conductive mounting plate. Means are provided for mounting the heater housing and the mounting plate to the fuel filter housing with the heater housing overlying the mounting plate and defining therewith the fuel passage. The fuel enters the heater from the fuel filter housing, enters the fuel passage in the heater housing, passes over the thermistor, or preferably plurality of thermistors and is coupled to the filter element. In this connection the mounting plate is preferably provided with an outlet therefrom also defining an outlet from the fuel passage so as to permit exit of the fuel into the filter element which is preferably a disposable filter.

In accordance with the present invention, although one embodiment described herein employs a thermostat, the preferred embodiment employs no thermostat and instead relies upon the use of a PTC thermistor that is of the low temperature variety. It has been found that a thermistor having a switching temperature in the range of 0° to 15° C. provides adequate heating without the necessity of using a thermostat for temperature control.

BRIEF DESCRIPTION OF THE DRAWINGS

Numerous other objects, features and advantages of the invention should now become apparent upon a reading of the following detailed description taken in conjunction with the accompanying drawings, in which:

FIG. 2 is a top view of the diesel fuel heater of FIG. 1 partially cut away to show the PTC mounting;

FIG. 3 is a cross-sectional view taken along line 3—3 of FIG. 2;

FIG. 4 is a top view of the heat conductor plate of the diesel fuel heater shown in FIGS. 2 and 3;

FIG. 5 is a fragmentary view similar to the cross-sectional view of FIG. 3 but for an alternate embodiment employing a thermostat along with the PTC thermistors;

FIG. 6 is a representative graph for a heater in accordance with the invention and plotting heater outlet temperature in °F. versus heater resistance in ohms; and FIG. 7 is a representative graph plotting input power in watts and temperature differential in °F. versus heater inlet temperature in °F.

DETAILED DESCRIPTION

Figure 1:
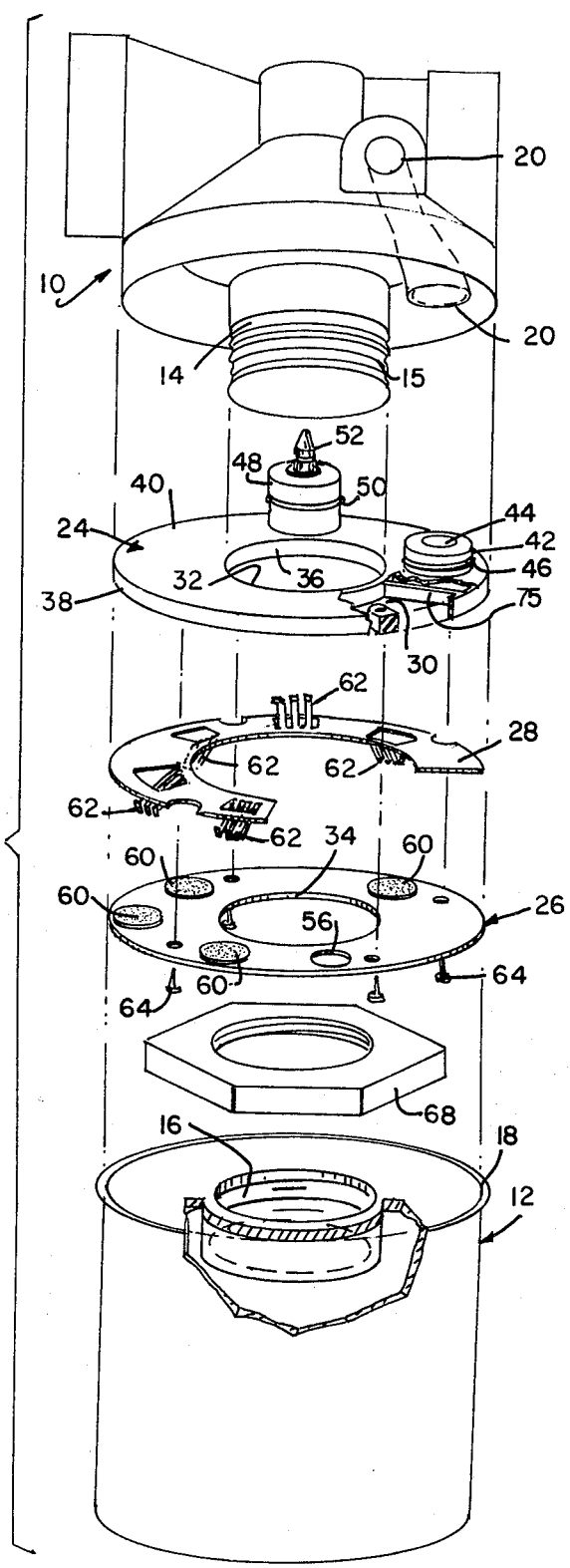
FIG. 1 is an exploded perspective view showing the diesel fuel heater of the present invention as integrated with a fuel filter and associated housing.

FIG. 1 is an exploded perspective view showing the diesel fuel heater of the present invention as integrated into a fuel filter. FIGS. 2-4 show the diesel fuel heater in further detail. FIG. 5 is a fragmentary view showing an alternate embodiment incorporating a thermostat along with the PTC thermistors. FIGS. 6 and 7 show pertinent graphs.

Referring to the drawing, there is shown a filter housing 10 adapted to support a disposable filter 12. For this purpose the fuel filter housing 10 is provided with an outlet pipe 14 that is externally threaded at 15. The disposable filter 12 has an internally threaded recess 16. These mating threaded members are engaged so as to secure the filter to its associated filter housing by means of screwing the filter onto the housing. In this connection there may also be provided a sealing means between the housing, heater and the top lip 18 of the disposable filter. In addition to the outlet pipe 14, the filter housing also has an inlet passage 20 through which the fuel passes by way of the housing to the disposable filter. Of course, in accordance with the present invention, the fuel passes through the heater to now be described before entering the disposable filter.

The PTC diesel fuel heater shown in FIG. 1, and also described in detail in FIGS. 2–4, comprises a diesel fuel heater housing 24, heat conductor plate 26, and contact ring 28. The heater housing 24 which may be constructed of nylon has essentially an open bottom and defines with the periphery of the conductor plate 26, an annular fuel passage 30 (also see FIG. 3). The heater housing 24 has a centrally disposed hole 32. Similarly, the conductor plate 26 is also provided with a centrally disposed substantially circular hole 34. These holes permit accommodation for the outlet pipe 14 of the filter housing 10. The inlet pipe 14 essentially extends through the heater housing 24 and the conductor plate 26 so that contact can be made with the disposable filter.

The hole 32 in the housing 24 is partially defined by one circumferential wall 36. The housing also has an outer circumferential wall 38. The annular passage 30 is defined between these walls 36 and 38. Extending from the top surface 40 of the housing 24, is an inlet pipe 42 with an inlet port 44. It is noted, for example, in FIG. 3, that the port 44 couples to the annular fuel passage 30. An O-ring 46 is preferably disposed about the fuel inlet pipe 42. The O-ring 46 will seal against one end of the inlet passage in the fuel filter housing 10. FIG. 3 shows, in phantom, the filter housing cooperating with the heater.

Also extending from the surface 40 of the heater housing, is a terminal post 48. This terminal post has associated therewith an O-ring 50. On top of the post 48 is the electrical terminal 52. The filter housing 10 is constructed of a metal such as aluminum and the circuit for the PTC thermistors includes the grounded filter housing 10. The terminal 52 inside of the post 48 appropriately connects to the conductor ring 28.

The conductor plate 26 has, in addition to the centrally disposed hole 34, an outlet passage 56. Four disc-shaped PTC thermistors 60 are positioned and mounted on the conductor plate 26 as illustrated, each being conductively secured to plate 26 by means such as solder or silver epoxy. It is also noted from FIG. 2 that each PTC thermistor 60 is conductively contacted by means of a multi-fingered contact spring 62. As depicted in FIG. 3, the leafs of the spring 62 extend from the contact ring 28 and provide a biasing force on the top surface of the thermistor to assure a good electrical connection thereto.

In assembling the heater of this invention, the contact ring 28 may be simply placed in the annular channel 30. The PTC thermistors are retained in place and affixed to the conductor plate such as with the use of a silver epoxy. Top and bottom surfaces of the thermistor disc represent the opposite electrodes of the thermistor. Thus, the contact spring 62 makes contact with one terminal of the thermistor and the silver epoxy provides electrical continuity with the other side of the thermistor to the conductor plate 26.

The conductor plate 26 is retained against the housing 24 by means of four screws 64. In this connection, the housing 24 has mounting portions 24a which have threaded holes 66 for receiving the screws 64. Alternatively, rivets could also be employed for securing together at least the conductor plate 26 and housing 24. The heater assembly (24, 26, 28) is then secured to the aluminum filter housing 10 by means of a jam nut 68, which is also threadably engaged on the threads 15 of outlet pin 14.

The fuel flow through the heater described in the drawing occurs in the following manner. The fuel enters the inlet passage 20 in the filter housing 10 and is coupled through the port 44 of the inlet pipe 42 of the heater housing 24. In FIG. 2 arrows 70 show the direction of fuel flow. In FIG. 2 this flow is in a counter clockwise direction through the annular fuel passage 30 passing over the secured PTC thermistors in series one after the other. In order to assure this direction of flow, there is provided within the housing 24 across the annular fuel passage, a dam or blockage member 75. This is disposed adjacent to the inlet pipe 42 and thus as the fuel enters the heater it circulates in the counter clockwise fashion illustrated in FIG. 2. After passing over these four parallel arranged PTC thermistors, the fuel exits at the outlet 56 essentially dropping into the filter. The outlet 56 is in the conductor plate 26.

As previously noted O-rings 46 and 50 are used to prevent leakage of any of the fuel from the filter housing. Similar sealing means are not necessary, for example, between the housing 24 and the conductor plate 26 because any slight leakage that might occur will only leak into the disposable filter.

In the embodiment described in FIGS. 1–4 no thermostat has been employed. However, in an alternate embodiment as depicted in the fragmentary view of FIG. 5, there may be provided a thermostat or thermodisc 80. The thermostat is preferably snap-fitted in the terminal post 48 providing a bi-metallic element that will interrupt current flow to the PTC thermistors at a predetermined temperature. When the thermostat is employed, it is preferably selected so that it goes "on" at a fuel temperature of 24° F. and switches "off" at a fuel temperature of 56° F. The thermostat is to assure that the temperature is retained within that limit.

Tables I and II depict tests that have been run on the heater of the present invention. Table I shows the current delivered to the heater as a function of both inlet and outlet temperatures. This test was run without the use of a thermostat. Table II shows a similar test with the use of a thermostat. It is noted that the heater current decreased to 5.3 amps and then was terminated by the thermostat interrupting current flow. In both tables I and II, 5° to 15° C. PTCs are used.

TABLE I

| TIME (MIN) | CURRENT (AMPS) | TANK (°C.) | FLOW (ml/min) | INLET (°F.) | OUTLET (°F.) | ΔT (°F.) |
|---|---|---|---|---|---|---|
| 0 | 0 | −20 | 650 | | | |
| 4 | 8.2 | −20 | | −3.0 | 7.0 | 10.0 |
| 8 | 8.1 | −18 | 630 | −1.0 | 8.7 | 9.7 |
| 12 | 7.9 | −17 | | +1.2 | 11.3 | 10.1 |
| 16 | 7.9 | −15 | | 2.8 | 12.5 | 9.7 |
| 20 | 7.7 | −14 | | 5.0 | 14.5 | 9.5 |
| 24 | 7.6 | −13 | | 7.4 | 16.6 | 9.2 |
| 28 | 7.5 | −11 | | 9.4 | 18.8 | 9.4 |
| 32 | 7.4 | −11 | | 11.3 | 20.0 | 8.7 |
| 36 | 7.2 | −10 | | 13.0 | 21.8 | 8.8 |
| 40 | 7.1 | −9 | 640 | 14.8 | 23.6 | 8.8 |
| 44 | 6.3 | −9 | | 16.8 | 26.0 | 9.2 |
| 48 | 6.9 | −8 | | 18.0 | 26.8 | 8.8 |
| 52 | 6.9 | −6 | | 19.9 | 28.0 | 8.1 |
| 56 | 6.8 | −6 | | 21.5 | 29.5 | 8.0 |
| 60 | 6.6 | −5 | | 23.2 | 30.7 | 7.5 |

TABLE I-continued

| TIME (MIN) | CURRENT (AMPS) | TANK (°C.) | FLOW (ml/min) | INLET (°F.) | OUTLET (°F.) | ΔT (°F.) |
|---|---|---|---|---|---|---|
| 64 | 6.5 | −4 | | 24.5 | 32.2 | 7.7 |
| 68 | 6.5 | −3 | | 26.0 | 33.8 | 7.8 |
| 72 | 5.7 | −3 | 555 | 27.0 | 36.0 | 9.0 |
| 76 | 5.6 | −2 | | 28.5 | 36.7 | 8.2 |
| 80 | 5.5 | −1 | | 30.2 | 38.3 | 8.1 |
| 84 | 5.4 | −0 | | 31.6 | 39.4 | 7.8 |
| 88 | 5.4 | −0 | | 33.0 | 40.3 | 7.3 |
| 92 | 5.3 | +1 | | 34.8 | 41.7 | 6.9 |
| 96 | 5.2 | +2 | | 35.9 | 43.5 | 7.6 |
| 100 | 5.1 | +3 | 565 | 36.6 | 44.7 | 8.1 |
| 104 | 5.1 | +3 | | 38.0 | 45.4 | 7.4 |
| 108 | 5.0 | +3 | | 38.5 | 46.3 | 7.8 |
| 112 | 5.0 | +4 | | 39.7 | 47.0 | 7.3 |
| 116 | 4.9 | +5 | | 40.5 | 48.0 | 7.5 |
| 120 | 4.8 | +5 | | 41.7 | 49.0 | 7.3 |
| 124 | 4.8 | +6 | | 43.0 | 50.1 | 7.1 |

TABLE II

| TIME (MIN) | CURRENT (AMPS) | TANK (°C.) | FLOW (ml/min) | INLET (°F.) | OUTLET (°F.) | ΔT (°F.) |
|---|---|---|---|---|---|---|
| 0 | | −26 | 602 | | | |
| 4 | 7.6 | −25 | | | | |
| 8 | 7.2 | −25 | | | | |
| 12 | 8.0 | −23 | 660 | | | |
| 16 | 8.0 | −20 | | 0.8 | 9.8 | 9.0 |
| 20 | 7.9 | −18 | | 3.2 | 11.2 | 8.0 |
| 24 | 7.6 | −16 | | 7.7 | 15.0 | 7.3 |
| 28 | 7.5 | −15 | | 10.5 | 17.8 | 7.3 |
| 32 | 7.3 | −13 | | 12.3 | 19.3 | 7.0 |
| 36 | 7.1 | −12 | | 15.3 | 21.9 | 6.6 |
| 40 | 6.8 | −10 | | 18.4 | 24.5 | 6.1 |
| 44 | 6.8 | −9 | | 20.8 | 27.0 | 6.2 |
| 48 | 6.6 | −7 | | 23.0 | 29.0 | 6.0 |
| 52 | 6.4 | −6 | 735 | 24.7 | 31.5 | 6.8 |
| 56 | 6.4 | −4 | | 28.8 | 34.3 | 5.5 |
| 60 | 6.1 | −3 | | 31.2 | 36.2 | 5.5 |
| 64 | 6.0 | −1 | | 33.2 | 38.5 | 5.3 |
| 68 | 5.9 | 0 | | 35.7 | 40.5 | 4.8 |
| 72 | 5.7 | 0 | | 37.0 | 41.7 | 4.7 |
| 76 | 5.5 | 0 | | 39.4 | 43.7 | 4.3 |
| 80 | 5.4 | 2 | | 40.7 | 45.3 | 4.6 |
| 84 | 5.3 | 2 | 735 | 42.5 | 46.8 | 4.8 |
| 88 | 0.0 | 4 | | 42.1 | 42.1 | |
| 92 | 0.0 | 4 | | | | |
| 96 | 0.0 | 4 | | | | |
| 100 | 0.0 | 4 | | | | |
| 104 | 0.0 | 3 | | | | |
| 108 | 0.0 | 3 | | | | |
| 112 | 0.0 | 3 | | | | |
| 116 | 0.0 | 3 | | | | |
| 120 | 0.0 | 3 | | | | |
| 124 | 0.0 | 3 | | | | |
| 128 | 0.0 | 2 | | | | |

FIGS. 6 and 7 show graphs which illustrate the preferred use of the first embodiment without the thermostat but preferably employing 0°–15 C. thermistors. FIG. 6 is a plot of heater resistance in ohms versus outlet temperature in °F. FIG. 7 illustrates input power (A) in watts and temperature differential (B) in °F. versus inlet temperature in °F. In FIG. 7, the fuel flow rate for the data on the left hand side of the vertical dashed line C is 10.1 gallons per hour and the flow rate on the right hand side of line C is 8.9 gallons per hour, the overall average fuel flow rate being 9.5 gallons per hour.

As indicated previously, the preferred heat source is in the form of a series of PCT thermistors of the low temperature switching type preferably with switching temperatures in the range of 0°–15 C. With this type of a PTC the resistance change is more gradual and it has been found that the wattage expended at the desired heat temperature is extremely small. Thus, by the time that the heater comes up to proper operating temperature such as on the order of 40° F., the resistance of the heater has decreased sufficiently so that there is extremely small power consumption. In this way, the thermostat can be eliminated and even if a relatively small current continuously flows through the heater, this is not of a sufficient magnitude to cause any fuel ignition.

Having described one embodiment of the present invention it should now be apparent to those skilled in the art that numerous other embodiments are contemplated as falling within the scope of this invention.

What is claimed is:

1. A diesel fuel heater in combination with, a fuel filter housing having an inlet and outlet and including a filter element secured to the filter housing, said heater comprising; a heater housing having means defining an inlet thereto, at least one positive temperature coefficient thermistor, means coupling power to the thermistor, a mounting plate for the thermistor having means defining an outlet therefrom, means retaining the thermistor to the mounting plate, and means for mounting the heater housing and mounting plate to the fuel filter housing with the heater housing overlying the mounting plate and defining therewith a fuel passage extending from the inlet of the heater housing to the outlet from the mounting plate, the circulating fuel passing via the filter housing through the fuel passage over the thermistor to the filter element.

2. A diesel fuel heater as set forth in claim 1 wherein said heater housing has an open bottom defining with the mounting plate an annular fuel passage.

3. A diesel fuel heater as set forth in claim 2 including a plurality of PTC thermistors.

4. A diesel fuel heater as set forth in claim 3 wherein said means for retaining the thermistors includes conductive epoxy or solder respectively holding said thermistors in a planar array to the mounting plate.

5. A diesel fuel heater as set forth in claim 4 including dam means in the fuel passage for directing fuel flow in one direction toward the outlet and over all PTC thermistors.

6. A diesel fuel heater as set forth in claim 5 wherein said means for coupling power to the thermistors includes a contact spring means disposed in the fuel passage and having separate contacts for each thermistor.

7. A diesel fuel heater as set forth in claim 1 wherein the thermistor is a low temperature thermistor having a switching temperature in the range of 0°–15° C.

8. A diesel fuel heater as set forth in claim 1 including a thermostat associated with the heater housing and adapted to be in circuit with the thermistor to control heater temperature.

9. A diesel fuel heater as set forth in claim 8 wherein the thermostat has a switch "on" temperature on the order of 24° F. and a switch "off" temperature on the order of 56° F.

10. A diesel fuel heater as set forth in claim 1 wherein the inlet in the heater housing is positioned to receive fuel into the fuel passage from thereover, the outlet in the mounting plate being disposed circumferentially spaced from the inlet and positioned to permit fuel flow downwardly therefrom to the filter element.

* * * * *